US009392533B1

(12) United States Patent
Vivanco et al.

(10) Patent No.: US 9,392,533 B1
(45) Date of Patent: Jul. 12, 2016

(54) METHODS AND SYSTEMS FOR DETERMINING A POSITION OF A USER EQUIPMENT DEVICE IN A MULTI-BAND WIRELESS COMMUNICATION SYSTEM

(71) Applicant: Sprint Spectrum L.P., Overland Park, KS (US)

(72) Inventors: Daniel Vivanco, Sterling, VA (US); Krishna D. Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 253 days.

(21) Appl. No.: 14/095,318

(22) Filed: Dec. 3, 2013

(51) Int. Cl.
*H04W 4/00* (2009.01)
*H04W 48/16* (2009.01)

(52) U.S. Cl.
CPC ..................... *H04W 48/16* (2013.01)

(58) Field of Classification Search
CPC ..... H04W 48/16; H04W 88/06; H04W 80/04; H04L 2012/5607
USPC .......... 455/434, 550.1, 552.3; 370/310.2, 328
See application file for complete search history.

(56) References Cited

U.S. PATENT DOCUMENTS

| 5,483,673 | A | * | 1/1996 | Hiben | .................... | H04W 76/02 455/512 |
| 6,044,270 | A | * | 3/2000 | Raith | ................ | H04W 36/0088 455/434 |
| 6,148,210 | A | * | 11/2000 | Elwin | .................... | H04W 68/00 455/450 |
| 6,243,591 | B1 | * | 6/2001 | Takemura | ............. | H04W 52/10 455/522 |
| 6,272,351 | B1 | * | 8/2001 | Langston | ............ | H04W 88/085 348/21 |
| 6,329,948 | B1 | * | 12/2001 | Ishikawa | ............... | G01S 5/0063 342/357.27 |
| 6,424,840 | B1 | * | 7/2002 | Fitch | ..................... | H04M 15/00 455/406 |
| 6,577,873 | B1 | * | 6/2003 | Kim | ...................... | H04W 16/00 375/355 |
| 6,804,311 | B1 | * | 10/2004 | Dabak | ................. | H04L 25/0228 375/267 |
| 6,961,543 | B2 | | 11/2005 | Hunzinger | | |
| 6,968,195 | B2 | | 11/2005 | Nowak | | |
| 6,968,212 | B1 | * | 11/2005 | Aoyama | .............. | H04B 7/0408 342/367 |
| 7,839,814 | B2 | | 11/2010 | Narasimha et al. | | |

(Continued)

FOREIGN PATENT DOCUMENTS

CA 2479225 7/2004

OTHER PUBLICATIONS

Mike Coward, DPI: Managing Data Traffic in LTE Networks, Sep. 3, 2008; 6 pages.

(Continued)

*Primary Examiner* — Steve D Agosta

(57) ABSTRACT

Methods and systems for determining how much time a user equipment (UE) device should spend scanning for base station signals and how often the UE device should provide reports to a position determining equipment (PDE) device regarding the scanned base station signals so as to determine an accurate position of the UE device, especially while the UE device is in motion or within areas of low base station density, are described. Selecting the rate to scan base station signals for a given frequency band can be based, at least in part, on the availability of the given frequency band in proximity to the UE device and to a throughput value associated with an application executing on the UE device. Selecting the rate to provide scanning reports can be based, at least in part, on a speed of the UE device and a network topology, such as base station density.

16 Claims, 8 Drawing Sheets

(56) References Cited

U.S. PATENT DOCUMENTS

2011/0244859 A1* 10/2011 Tsuda ................. H04W 36/245
455/436
2012/0178465 A1 7/2012 Lin et al.

OTHER PUBLICATIONS

Zahid Ghadialy, How is 6 ms length of measurement gap enough for identification of an UMTS cell? Nov. 10, 2009; 2 pages.

Mirjana Simić and Predrag Pejović, Positioning in Cellular Networks, Cellular Networks—Positioning, Performance Analysis, Reliability, Dr. Agassi Melikov (Ed.), ISBN: 978-953-307-246-3, InTech, Chapter 2; 27 pages, Apr. 2011.

Andreas Rosssler, Bridging the gap between LTE and 1xEV-DO LTE-to-HRPD handover—A key element in LTE development, Rohde & Schwarz, Germany Mar. 2010; 28 pages.

LTE in Wireless: Report CGI in Measurement Report and ANR, downloaded from the World Wide Web at http://lteinwireless.blogspot.com/2012/12/reportcgi-in-measurement-report-and-anr.html on Nov. 21, 2013; 9 pages.

Location-based service, downloaded from World Wide Web at http://en.wikipedia.org/wiki/Location-based_service on Nov. 21, 2013; 5 pages.

David Tipper, Prashant Krishnamurthy and James Joshi, Network architecture and protocols for mobile positioning in cellular wireless systems; University of Pittsburgh, Pittsburgh, PA. Oct. 29, 2007; 8 pages.

Stephen Lawson, Sprint taps into its spectrum for fast LTE, with room to grow; downloaded from the World Wide Web at http://www.techhive.com/article/2059780/sprint-taps-int-its-spectrum-for-fast-lte-with-room-to-grow.html, Oct. 31, 2013; 4 pages.

* cited by examiner

| Signal Scan Reporting Rate | Speed | Base Station Density |
|---|---|---|
| Rate 1 | High | Low |
| Rate 2 | High | High |
| Rate 3 | Low | Low |
| Rate 4 | Low | High |

Fast ↑ Reporting Rate ↓ Slow

| SIGNAL SCANNING RATE | FREQUENCY BAND AVAILABILITY | UE DEVICE APPLICATION THROUGHPUT |
|---|---|---|
| INFINITY | NOT AVAILABLE | DON'T CARE |
| AGGRESSIVE (HIGH) | AVAILABLE | LOW |
| INTERMEDIATE N (MEDIUM N) | AVAILABLE | INTERMEDIATE # N |
| RELAXED (LOW) | AVAILABLE | HIGH |

SCANNING RATE: HIGH ↔ LOW
THROUGHPUT: LOW ↔ HIGH

METHODS AND SYSTEMS FOR DETERMINING A POSITION OF A USER EQUIPMENT DEVICE IN A MULTI-BAND WIRELESS COMMUNICATION SYSTEM

BACKGROUND

Unless otherwise indicated herein, the elements described in this section are not prior art to the claims and are not admitted to be prior art by inclusion in this section.

As the use of mobile communication devices continues to increase, location-based services performed for or by a mobile communication device can be useful to a user of the mobile communication device. A location-based service (LBS) can include an information service that is accessible by the mobile communication device through a mobile communication network. Performance of the LBS can be based on a location (i.e., a position) of the mobile communication device.

The location of a mobile communication device can be determined using global positioning system (GPS) satellites, but the signals from those satellites may not be available to a mobile communication device in certain situations, such as while that device is indoors or within a tunnel.

Alternatively, the location of the mobile communication device can be determined using trilateration, such as advanced forward link trilateration (AFLT), based on signals of a given frequency band the mobile communication device measures from a base transceiver station serving the mobile communication device and signals within the given frequency band from other base transceiver stations. Determining an accurate location of the mobile communication device can be affected by various factors, such as, but not limited to, a speed of the mobile communication device while the mobile communication device is within a vehicle, weak signals from a base transceiver station, a low density of base stations serving the mobile communication device, or some other reason. A way to determine a more accurate location of a mobile device is desirable.

OVERVIEW

This application describes several example embodiments, at least some of which pertain to determining positions of a user equipment (UE) device operating within a multi-band wireless communication system. The UE device can comprise a multi-band UE device such as a dual-band UE device or a tri-band UE device. The UE device can comprise a mobile communication device. The determined positions can be used in performing a location-based service (LBS) for or by the UE device, or for some other reason. The example embodiments can result in more accurate positions being determined as compared to prior art methods.

A multi-band UE device can be configured to keep multiple radio frequency (RF) transceivers, within the UE device, connected simultaneously so as to be configured to simultaneously scan signals transmitted by multiple base transceiver stations that are using different frequency bands or different radio access technologies. A position determining equipment (PDE) device can provide to the multi-band UE device a signal scanning rate and a signal scan report rate to cause the UE device to scan RF signals from a BTS at the signal scanning rate and to transmit signal scan reports at the signal scan report rate. Multiple devices within the multi-band communication system can be used in transmitting the signal scanning rate and the signal scan reporting rate from the PDE device to the UE device.

In one respect, an example embodiment can take the form of a method comprising: (i) selecting, by a processor and from among a plurality of signal scanning rates, a signal scanning rate for use by a UE device to scan for signals on at least one frequency band other than a frequency band a base station is using to serve the UE device, (ii) selecting, by the processor and from among a plurality of signal scan reporting rates, a signal scan reporting rate for use by the UE device, and (iii) providing, using a communication network, the selected signal scanning rate and the selected signal scan reporting rate to a transmitting device for wireless transmission of the selected signal scanning rate and the selected signal scan reporting rate to the UE device.

In another respect, an example embodiment can take the form of a system comprising: (i) a processor, (ii) a data storage device storing a plurality of signal scanning rates, a plurality of signal scan reporting rates, and computer-readable program instructions, wherein the program instructions are executable by the processor to select, from among the plurality of signal scanning rates, a signal scanning rate for use by a UE device to scan for signals on at least one frequency band other than a frequency band a base station is using to serve the UE device, and wherein the program instructions are executable by the processor to select, from among the plurality of signal scan reporting rates, a signal scan reporting rate for use by the UE device, and (iii) a communication network interface configured to provide the selected signal scanning rate and the selected single scan reporting rate to a transmitting device for wireless transmission of the selected signal scanning rate and the selected signal scan reporting rate to the UE device.

In yet another respect, an example embodiment can take the form of a wireless UE device comprising: (i) a processor, (ii) a plurality of transceivers including at least a first radio frequency (RF) transceiver and a second RF transceiver, wherein the first RF transceiver is configured for a first RF band and the second RF transceiver is configured for a second RF band different than the first RF band, and (iii) a computer-readable data storage device storing computer-readable program instructions executable by the processor to produce signal scan reports regarding RF signals scanned by the first RF transceiver and regarding RF signals scanned by the second RF transceiver. The first RF transceiver is configured to receive, from a base station serving the UE device, a signal scanning rate for the second RF transceiver to use to scan signals on the second RF band. The first RF transceiver is configured to receive, from the base station serving the UE device, a signal scan reporting rate, and to transmit signal scan reports at the received signal scan reporting rate.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 3 is a table showing example signal scan reporting rate data and corresponding values for selecting a signal scan reporting rate.

FIG. 8 is a table showing example signal scanning rate data and corresponding values for selecting a signal scanning rate.

DETAILED DESCRIPTION

I. Introduction

This description describes several example embodiments and several figures accompanying the description. Within the description and figures, the articles "a" or "an" are used to introduce elements of the example embodiments. The intent of using those articles is that there is one or more of the elements. The intent of using the conjunction "or" within a described list of at least two terms in the description or figures is to indicate any of the listed terms or any combination of the listed terms. The use of ordinal numbers such as "first," "second," "third" and so on in the description or figures is to distinguish respective elements rather than to denote a particular order of those elements unless the context of using those terms explicitly indicates otherwise.

The diagrams, depictions, and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (e.g., machines, interfaces, functions, orders, or groupings of functions or operations) can be used instead. Each element or components of an element shown in the figures or described in this description, alone or in combination with one or more other elements or components of the one or more other elements, can be referred to as a system, a device, or a machine. Furthermore, various functions or operations described as being performed by one or more elements can be carried out by a processor executing computer-readable program instructions or by any combination of hardware, firmware, or software.

II. Example System Architecture

Figure 1:
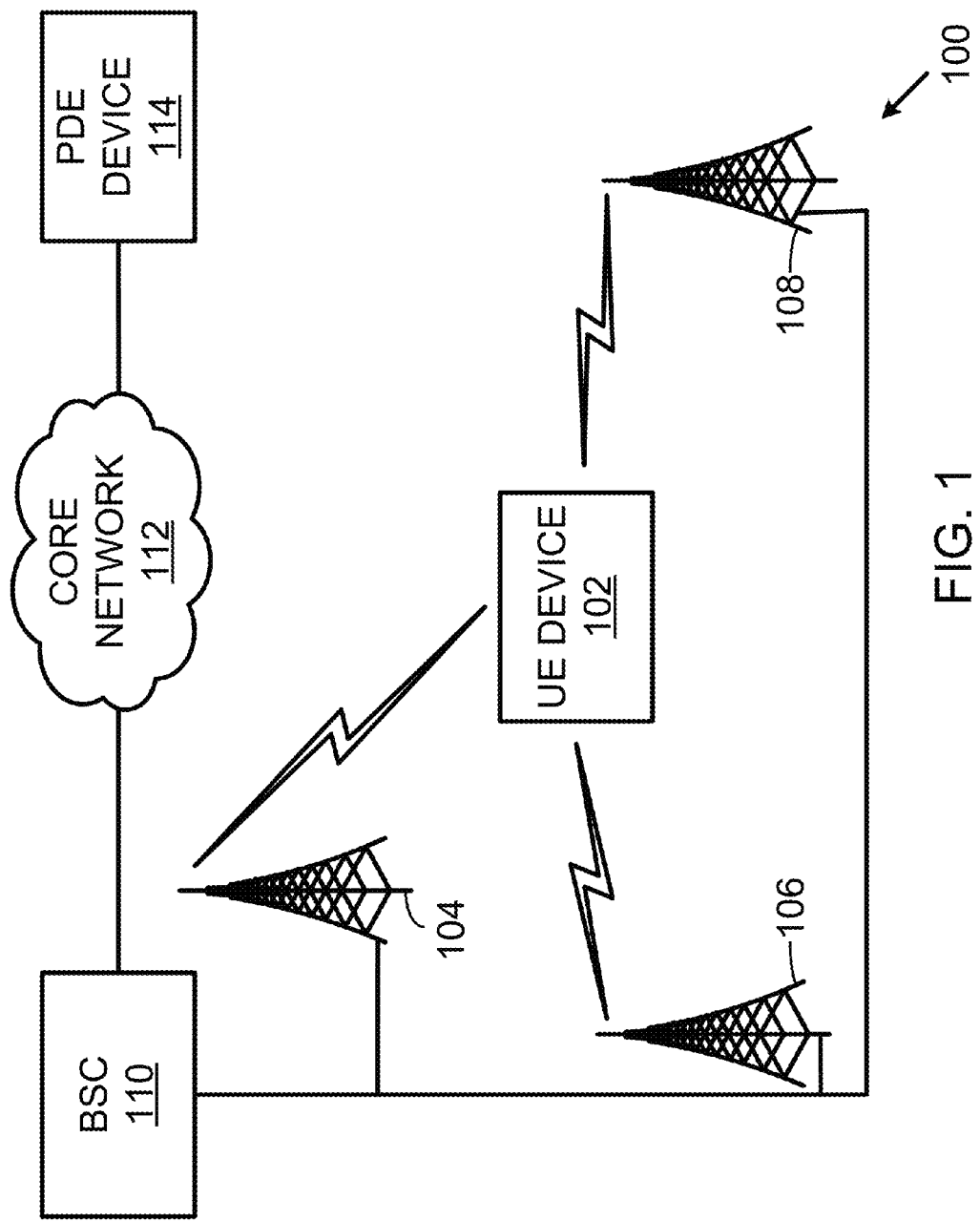
FIG. 1 is a simplified block diagram of an example communication system.

FIG. 1 shows an example communication system 100 in accordance with one or more of the example embodiments. System 100 includes a UE device 102, base transceiver stations (or more simply, "base stations") 104, 106, and 108, a base station controller (BSC) 110, a core network 112, and a position determining equipment (PDE) device 114. System 100 can include one or more other UE devices, one or more other base stations, one or more other BSCs, one or more other core networks, one or more other PDE devices, or one or more other elements, some of which are described below.

Each base transceiver station (BTS) shown in FIG. 1 can provide one or more radio frequency (RF) coverage areas (e.g., one or more sectors) in which UE devices, such as UE device 102, can carry out wireless communications using an air interface protocol associated with the RF coverage area(s). Portions of two or more RF coverage areas can overlap each other.

Each RF coverage area is associated with a frequency band. Each frequency band can be referred to by a single frequency, such as an 800 megahertz (MHz) frequency band. Each frequency band can be wider than a single frequency. For instance, an 800 MHz frequency band can include reverse-link channels within the range 806-824 MHz, inclusive, and forward-link channels within the range 851-869 MHz, inclusive.

A BTS and UE device can communicate over a frequency band using a radio access technology (RAT) that can be defined, at least in part, by an air interface protocol. Examples of an air interface protocol used by a BTS and UE device include, but are not limited to, long term evolution (LTE), code division multiple access (CDMA), WiMAX®, integrated digital enhanced network (IDEN), global system for mobile communications (GSM), general packet radio service (GPRS), universal mobile telecommunications system (UMTS), enhanced data rates for GSM evolution (EDGE), multichannel multipoint distribution service (MMDS), WiFi®, and BLUETOOTH®. The LTE protocol was defined by the $3^{rd}$ Generation Partnership Project (3GPP).

Base transceiver stations 104, 106, and 108 can be configured in any of a variety of BTS arrangements. Three particular example BTS arrangements are described below. Other example arrangements of one or more of BTS 104, 106, and 108 are also possible.

As a first example, BTS 108 can be configured as a BTS of an evolved UMTS terrestrial radio access network (E-UTRAN) for an evolved system defined by the 3GPP. A radio network including a BTS and UE device within an E-UTRAN can operate according to an LTE standard defined by the 3GPP. A BTS in a communication system operating within an E-UTRAN or according to the LTE standard can be referred to as an evolved Node B (eNode-B). An e-Node-B can connect directly to core network 112.

In accordance with one or more example embodiments, BTS 104 and BTS 106 and other BTS (not shown) in system 100 can also be configured as an e-Node B. The BTS of those embodiments can be configured to operate using any one of two or more frequency bands used by system 100.

As a second example, BTS 106 can be configured as a BTS of a UMTS terrestrial radio access network (UTRAN) for a 3G system defined by the 3GPP. A radio network, including a BTS and UE device within a UTRAN can operate according to a wide-band CDMA (W-CDMA) standard defined or adopted by the 3GPP. A BTS in a network operating according to the UMTS can be referred to as a Node-B. In accordance with this second example, system 100 can include a radio network controller (RNC) or BSC 110 can be configured as an RNC. An RNC can control one or more Node-Bs that connect to the RNC. An RNC can include one or more gateways for connecting to and communicating with core network 112.

In accordance with one or more example embodiments, BTS 104 and BTS 108 and other BTS (not shown) in system 100 can also be configured as a Node-B. The BTS of those embodiments can be configured to operate using any one of two or more frequency bands used by system 100.

As a third example, BTS 104 can be configured as a BTS of an EIA-TIA-95A network, a CDMA2000 network, or a GSM network. A radio network, including a BTS and UE device within one or those networks can operate according to a CDMA standard, such as CDMA2000-1X or CDMA2000-

1X-EVDO. In accordance with one or more example embodiments, BTS 106 and BTS 108 and other BTS (not shown) in system 100 can also be configured as BTS 104 described in this third example. The BTS of those embodiments can be configured to operate using any one of two or more frequency bands used by system 100.

FIG. 1 shows a single UE device. A person having ordinary skill in the art will understand that one or more UE devices can operate within each coverage area provided by each BTS that is operable within system 100. Each UE device operable within system 100 can be configured like UE device 102. The functions and methods described herein with respect to UE device 102 can be performed for one or more other UE devices operable within system 100.

UE device 102 can be served by a BTS within system 100. In one respect, UE device 102 can be a mobile UE device. A mobile UE device can be moved from a first coverage area to a second coverage area, operate with a first BTS while located in the first coverage area and while moving towards the second coverage area, and switch to operate with a second BTS after entering the second coverage area. A BTS with which UE device 102 is operating can be considered a serving BTS. A serving BTS can cause registration of the UE device in a home location register so that communications, such as a voice call or electronic message can be routed to UE device 102.

In another respect, a UE device can be a stationary UE device that is configured to operate at a fixed location. The fixed location may be limited to a location at which the stationary UE device can receive electrical power to operate the UE device.

UE device 102 can be configured as or include any of a variety of wireless communication devices. For example, UE device 102 can be configured as or include a mobile phone, a cellular phone, a feature phone, a smart phone, a personal digital assistant, a tablet computing device, or a laptop or desktop personal computer including a wireless modem, such as a 3G/4G USB modem 250U sold by Sprint®.

UE device 102 can be configured as a multiband UE device, such as a dual-band UE device or a tri-band UE device. A dual-band UE device can include transmitters for transmitting RF signals within two distinct frequency bands, and can include receivers for receiving RF signals within two distinct frequency bands. One or more of the frequency bands used by a transmitter of a dual-band UE device can be the same as a frequency band used by the receiver of the dual-band UE device. One or more of the frequency bands used by a transmitter of a dual-band UE device can be different than a frequency band used by the receiver of the dual-band UE device. As an example, the frequency bands used by a dual-band UE device can be the 800 megahertz (MHz) frequency band and the 1.9 Gigahertz (GHz) frequency band. Other examples of frequency bands used by a dual-band UE device are also possible.

A tri-band UE device can include transmitters for transmitting RF signals within three distinct frequency bands, and can include receivers for receiving RF signals within three distinct frequency bands. One or more of the frequency bands used by a transmitter of a tri-band UE device can be the same as a frequency band used by the receiver of the tri-band UE device. One or more of the frequency bands used by a transmitter of a tri-band UE device can be different than a frequency band used by the receiver of the tri-band UE device. As an example, the frequency bands used by a tri-band UE device can be the 800 MHz frequency band, the 1.9 GHz frequency band, and the 2.5 GHz frequency band. Other examples of frequency bands used by a tri-band UE device are also possible.

The example embodiments are also applicable to multi-band UE devices that are operable within more than three frequency bands. For instance, the example embodiments are applicable to a quad-band UE device.

Core network 112 can comprise a network operated by a service provider. The components of core network 112, as well as the components that connect a UE device to core network 112, can perform various services for the UE device that connects to core network 112. A core network can comprise one or more gateways. Each gateway can connect the core network, or a device within or accessing the core network, to another network such as a public-switched telephone network (PSTN). The core network can connect to a UE device using an e-Node-B, an RNC, or a BSC of a radio network and, in turn, connect that UE device to another network connected to the core network or to another device using the other network.

Core network 112 can comprise a data storage device that stored network topology information and UE device information as described herein.

PDE device 114 is equipment (e.g., a device or system) for determining positions (i.e., locations) of UE devices operating within the RF coverage areas provided by a BTS operating as part of system 100. PDE device 114 can use various data to determine the position of a UE device. PDE device 114 can, for example, receive the data to determine the UE device position from a device within core network 112. The example embodiments can be configured such that PDE device 114 receives the data to determine the UE device position from a device outside of core network 112, such as a device in a radio network, such as BSC 110, a BTS, or the UE device.

System 100 can include one or more other PDE devices (not shown). The other PDE device(s) can be configured like PDE device 114 or in another manner. System 100 can include a mobile positioning center (MPC) (not shown) that connects to multiple PDE devices. The MPC, for example, can communicate position information determined using a PDE device to a public safety answering point (PSAP) for emergency services. The MPC can be located with a PDE device or the MPC functionality can be included within a PDE device.

III. Example Position Determining Equipment

Figure 2:
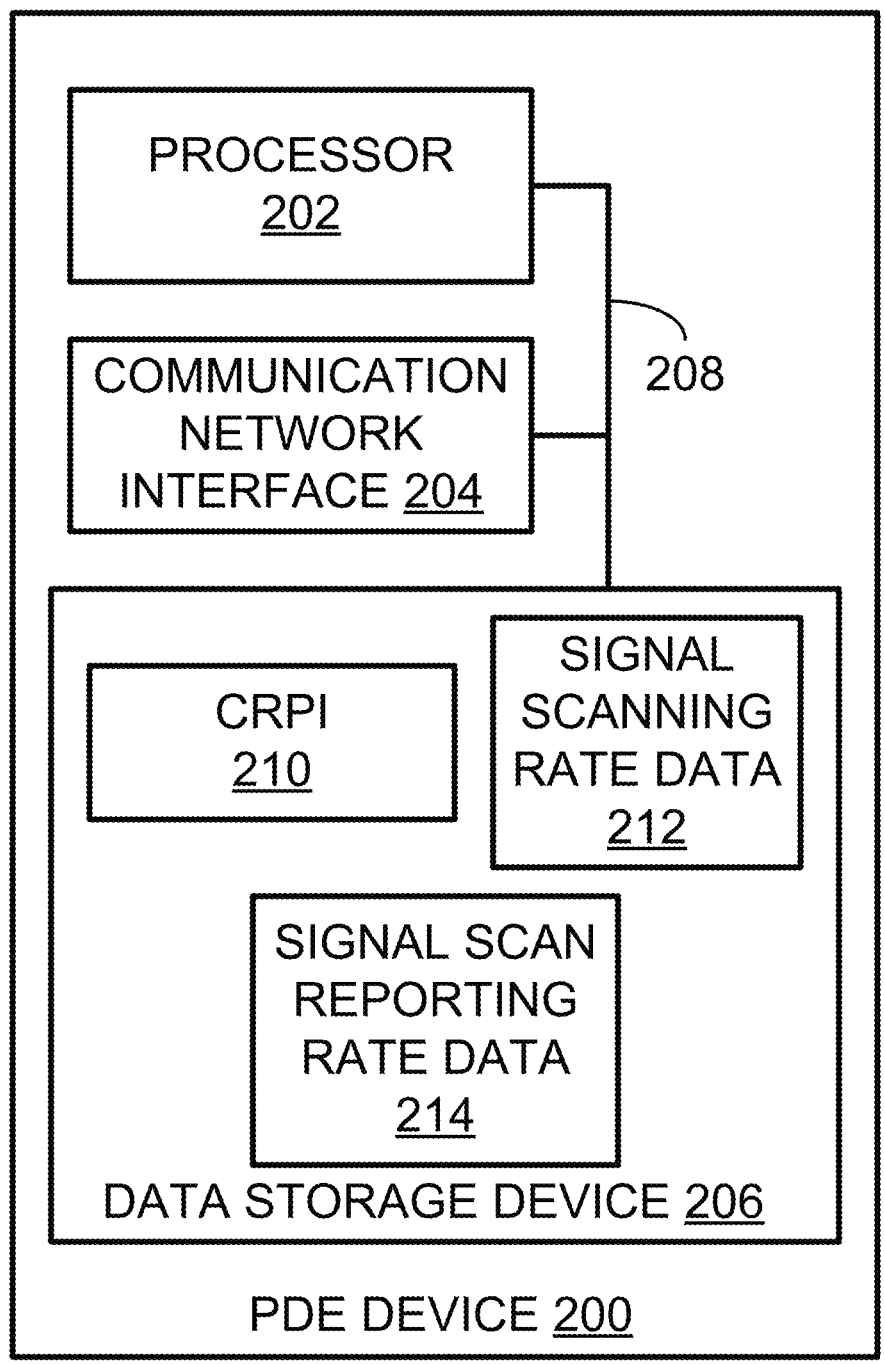
FIG. 2 is a simplified block diagram of an example position determining equipment (PDE) device.

Next, FIG. 2 is a simplified block diagram showing an example position determining equipment (PDE) device 200. PDE device 114, shown in FIG. 1, can be configured like PDE device 200. PDE device 200 can be used within system 100 similar to PDE device 114 or in another manner. PDE device 114 and PDE device 200 can each be referred to as a PDE device.

PDE device 200 includes a processor 202, a communication network interface 204, and a data storage device 206, all of which can be linked together via a system bus, network, or other connection mechanism 208.

A processor, such as processor 202 or any other processor disclosed herein, can comprise one or more general purpose processors (e.g., INTEL single core microprocessors or INTEL multicore microprocessors) or one or more special purpose processors (e.g., application specific integrated circuits (ASICs) or digital signal processors (DSPs)). Processor 202 can execute computer-readable program instructions, such as computer-readable program instructions (CRPI) 210.

Other processors can execute CRPI within data storage devices associated with the other processors.

Communication network interface 204 can include an interface to one or more communication networks. A communication network connected to PDE device 200 by communication network interface 204 or otherwise can provide for transmitting any of the data described herein. The communication network can include a wide area network, such as the Internet.

A data storage device, such as data storage device 206 or any other data storage device disclosed herein, can comprise a non-transitory computer-readable storage medium readable by a processor. A computer-readable storage medium can comprise volatile and/or non-volatile storage components, such as optical, magnetic, organic or other memory or disc storage, which can be integrated in whole or in part with a processor. A data storage device, such as data storage device 206, or a portion thereof, can also or alternatively be provided as a separate non-transitory machine readable medium distinct from a processor, such as processor 202.

Data storage 206 comprises CRPI 210, signal scanning rate data 212, and signal scan reporting rate data 214. CRPI 210 can include program instructions, executable by processor 202, to perform any function described herein as being performed, fully or at least partially, by a PDE device.

The data stored in a data storage device can be stored as part of a data structure so that the data can used efficiently by a processor, or otherwise. As an example, a data structure can be configured as an array, a record, a table, a union, a set, a graph, an object, a database. Other examples of data structures for storing data are also possible.

Figure 5:
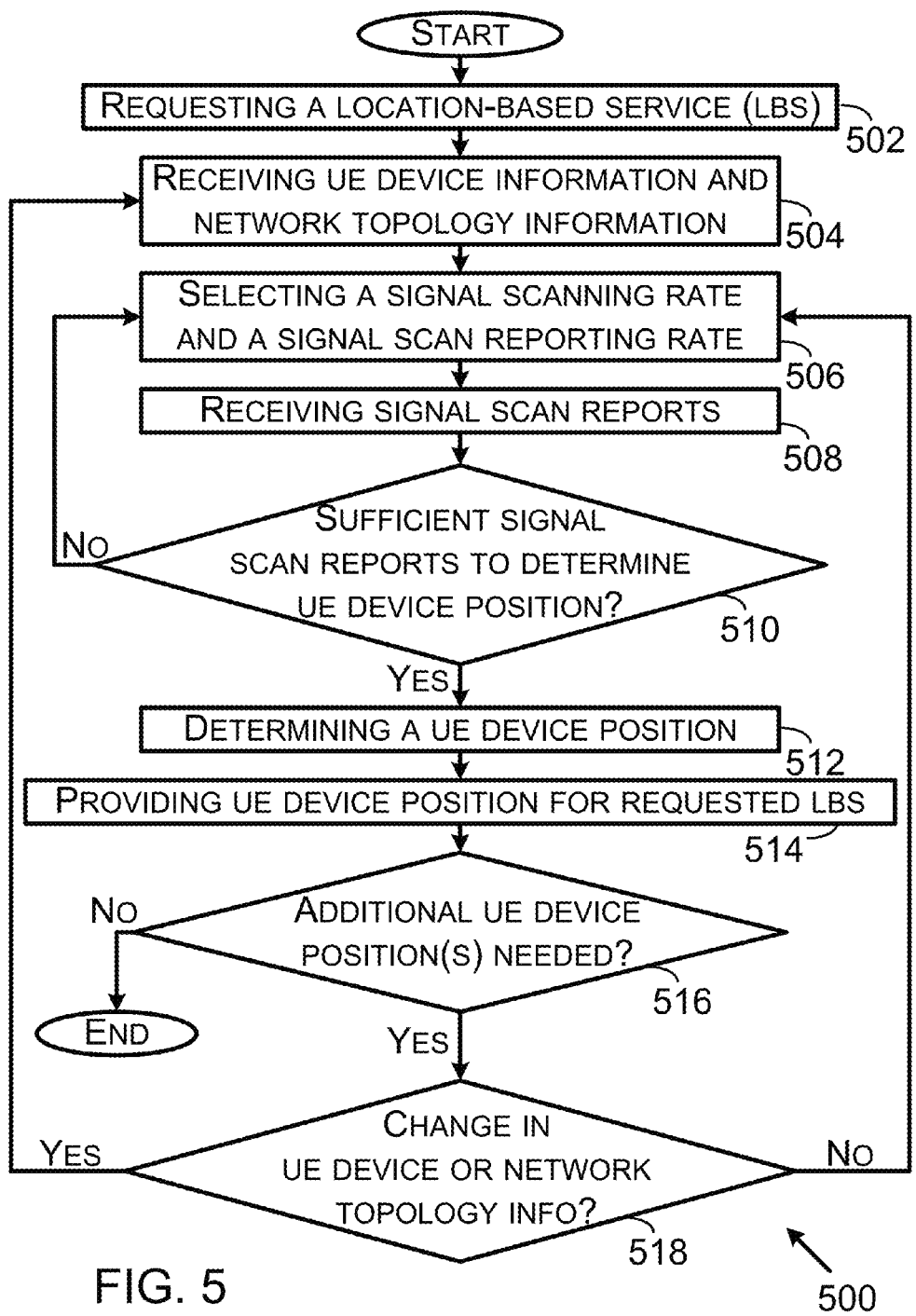
FIG. 5 is a flowchart depicting a set of functions that can be carried out in accordance with one or more example embodiments described herein.

CRPI 210 can comprise program instructions to perform any or all of the functions shown in FIG. 5. In that regard, an example embodiment can comprise a computer-readable data storage device comprising program instructions executable by a processor to cause performance any or all of the functions shown in FIG. 5. As an example, execution of those program instructions can cause performance of (i) selecting, from among a plurality of signal scanning rates, a signal scanning rate for use by UE device 102 to scan for signals on at least one frequency band other than a frequency band a base station is using to serve UE device 102, (ii) selecting, from among a plurality of signal scan reporting rates, a signal scan reporting rate for use by UE device 102, and (iii) providing, using a communication network, the selected signal scanning rate and the selected signal scan reporting rate to a transmitting device for wireless transmission of the selected signal scanning rate and the selected signal scan reporting rate to UE device 102. Examples of other functions performed by execution of CRPI 210 are also possible.

Signal scanning rate data 212 can comprise a plurality of signal scanning rates. CRPI 210 can include program instructions executable by processor 202 to select a signal scanning rate, provide the selected signal scanning rate to communication network interface 204 for transmitting the selected signal scanning rate to a UE device 102. Signal scanning rate data 212 can also include data usable to select a signal scanning rate (e.g., data upon which selection of the data rate is conditioned).

FIG. 8 shows a table 800 including an example of signal scanning rate data 212 including four example signal scanning rates (i.e., infinity, aggressive (high), intermediate N (medium N), and relaxed (low)), and frequency band availability data and UE device application throughput data usable for selecting a signal scanning rate. As an example, the aggressive signal scanning rate can be 40 ms, the relaxed signal scanning rate can be 80 ms, and the intermediate N rate can be a rate between the aggressive and relaxed scanning rates, such as 60 ms. Other examples of the signal scanning rates shown in table 800 are also possible. Examples of the frequency band availability and the UE device application throughput shown in table 800 are discussed hereafter.

CRPI 210 can include program instructions executable by processor 202 to select a signal scanning rate, provide the selected signal scanning rate to communication network interface 204 for transmitting the selected signal scanning rate to a UE device 102.

Signal scan reporting rate data 214 can comprise a plurality of signal scan reporting rates. A signal scan reporting rate can include or indicate a rate (e.g., an amount of time) of how often a UE device should report the signal scans performed by the UE device. FIG. 3 shows a table 300 including four example signal scan reporting rates (i.e., Rate 1, Rate 2, Rate 3, and Rate 4). As an example, Rate 1 can be 1 second, Rate 2 can be 3 seconds, Rate 3 can be 5 seconds, and Rate 4 can be 8 seconds. Other examples of Rate 1, Rate 2, Rate 3, and Rate 4 are also possible. Additionally or alternatively, signal scan reporting rate data 214 can comprise one, two, three, or five or more signal scan reporting rates.

Table 300 also includes speed and base station density (BSD) values corresponding to each example signal scan reporting rate. Table 300 shows two example speed values (i.e., low or high) and two example BSD values (i.e., low or high). The speed values can represent a speed of UE device 102 (i.e., a UE device speed). Each pair of speed and BSD values can be unique as shown in table 300 so that the corresponding signal scan reporting rate can be selected based on a UE device speed and BSD determined by processor 202.

The low speed and high speed of table 300 can represent respective ranges of speed. As an example, the low speed can represent a range of speed from zero to thirty (0 to 30) miles per hours, inclusive, and the high speed can represent a range of speed from greater than thirty to one hundred (>30 to 100) miles per hour. Other example ranges of speeds are possible.

The low and high BSD values of table 300 can represent a quantity of BTS within a given area around a BTS, such as a BTS serving UE device 102. As an example, the given area can be the area of a circle around the BTS with the BTS at the center of the circle and with a particular radius, such as 0.5 miles or 1 mile. The low BSD value can be applicable if there is one to N BTS within the given area and the high BSD value can be applicable if there is greater than N BTS within the given area. As an example, N can be 4, 5, 6 or some other number greater than 1.

CRPI 210 can include program instructions executable by processor 202 to select a signal scan reporting rate, provide the selected signal scan reporting rate to communication network interface 204 for transmitting the selected signal scan reporting rate to a UE device 102.

IV. Example Operation

FIG. 5 depicts a flowchart showing a set of functions (e.g., operations) 500 (or more simply, "the set 500") that can be carried out in accordance with any or two or more of the example embodiments described herein. The functions of the set 500 are shown within blocks labeled with even integers between 502 and 518, inclusive. Any other function(s) described herein can be performed prior to, while, or after performing any one or more of the functions of the set 500. Those other function(s) can be performed in combination with or separately from any one or more of the functions of the set 500. Any function described below, or elsewhere in this description, with respect to FIG. 5 or a PDE device can be performed by processor 202 executing program instructions of CRPI 210. Any function described below, or elsewhere in this description, with respect to FIG. 5 or a UE device can be performed by processor 702 executing CRPI 716 (shown in FIG. 7).

Block 502 includes requesting a location-based service (LBS). Requesting the LBS can include requesting performance of an LBS for or with respect to UE device 102. Requesting the LBS can be initiated by any of a variety of devices, such as UE device 102, a BTS (e.g., BTS 104, 106, or 108), a BSC (e.g., BSC 110 or an RNC), core network 112, or another device, such as a device within a PSAP. Requesting the LBS can include transmitting, to PDE device 114, a UE device position request for the position of UE device 102. The UE device position request can be forwarded throughout system 100 from the initiating device to PDE device 114. The UE device position request can function as a trigger for PDE device 114 to determine a signal scanning rate or a signal scan report rate.

Next, block 504 includes receiving UE device information and network topology information. Receiving the UE device information and network topology information can include PDE device 114 receiving the UE device and network topology information. PDE device 114 can store the received UE device information and the received network topology information at or within data storage device 206.

Receiving the UE device information can include PDE device 114 receiving a UE device speed associated with UE device 102 or information that PDE device 114 can used to determine a UE device speed associated with UE device 102. As an example, UE device 102 can include a speed sensor and UE device can transmit a UE device speed determined by or using the speed sensor. As another example, BSC 110 or another device in system 100 can determine a UE device speed based on a coverage area to coverage area (e.g., cell to cell) handover timing value determined by BSC 110 or the other device. A UE device speed can be an estimate of a speed of UE device 102.

Receiving the UE device information can include PDE device 114 receiving a trajectory of UE device 102. A trajectory of UE device 102 can be a predicted trajectory. A predicted trajectory can be determined based on the LBS requested to be performed. For example, the requested LBS can include a mapping service pertaining, at least in part, to a destination location that can be used to predict the trajectory of UE device 102 from a current location of UE device 102.

Receiving the network topology information can include PDE device 114 receiving location data indicating a location of a BTS serving UE device 102 and PDE device 114 requesting network topology information from network topology data based on the received BTS location.

TABLE 1

| Location | Frequency Band 800 MHz | Frequency Band 1.9 GHz | Frequency Band 2.5 GHz |
|---|---|---|---|
| City #1 | Yes | Yes | No |
| City #2 | No | Yes | Yes |
| Lat. 1, Long. 1 | No | No | Yes |
| Lat. 2, Long. 2 | Yes | No | Yes |

Table 1 shows an example of network topology data from which the network topology information can be retrieved for providing to PDE device 114 an estimate of frequency bands available in a current location of UE device 102 or the BTS serving UE device 102. Table 1 shows that a BTS location can be represented as a city name (e.g., City #1) or latitude and longitude values. Other examples of representing a BTS location also possible. Moreover, the topology information does not have to use a BTS location, but can use an estimated location of UE device 102 or another location to determine or select the network topology information. Each location within network topology data 216 can be associated with zero, one, two or more frequency bands available at the location. Additionally or alternatively, each location can be associated with a radio access technology available at the location.

Network topology data can be stored at various locations within system 100. As an example, the network topology data can be stored within a computer-readable data storage device within core network 112. That data storage device can, for example, be located within or as part of an element management system (EMS) of core network 112. As another example, the network topology data can be stored within a computer-readable data storage device of a PDE device, such as data storage device 206 of PDE device 114.

Any of the UE device information or network topology information received at PDE device 114 can be received in response to PDE device 114 transmitting a request for the UE device information or network topology information. Additionally or alternatively, all or some portion of the UE device information or network topology information can be provided to PDE device 114 along with a request for an LBS. Additionally or alternatively, all or some portion of the UE device information or network topology information can be provided to PDE device 114 as UE device 102, a BTS, BSC 110 or core network 112 determine that UE device or network topology information.

Next, block 506 includes selecting a signal scanning rate and a signal scan reporting rate. PDE device 114 can execute program instructions of CRPI 210 to make each of those selections. In one respect, selecting the rates at block 506 can include selecting the rates for the frequency bands or RATs used by one or more BTSs that are not currently serving UE device 102, but that are within proximity to UE device 102. In another respect, a signal scanning rate or a signal scan reporting rate for a frequency band or RAT being used by a BTS currently serving UE device 102 can be selected based on the frequency band or the RAT being used by the serving BTS and UE device 102. In an alternative arrangement, a BTS that is serving UE device 102 can select the signal scanning rate or signal scan reporting rate to be used by UE device 102 for signals transmitted by the serving BTS.

PDE device 114 can refer to UE device information and network topology information received by a PDE device at block 504 and signal scanning rate data 212 to select a signal scanning rate. Selecting the signal scanning rate can include selecting a scanning rate for one or more frequency bands or RATs used by a BTS that is not currently serving UE device 102. PDE device 114 can refer to the network topology information to determine whether a given frequency band is available or not available. If the given frequency band (e.g., 800 MHz) is not available, the PDE device can select a signal scanning rate of infinity, regardless of the throughput of any application executing at UE device 102. UE device will not scan for the given frequency band while the signal scanning rate for the given frequency is infinity.

On the other hand, if the given frequency band is available to the UE device, the PDE device can select the signal scanning rate based on a throughput value (e.g., a throughput requirement) of an application executing at UE device 102. The UE device information received at block 504 can include data identifying the application(s) executing at the UE device or the throughput values associated with those application(s).

As shown in table 800, if the throughput value of an application is low, the selected scanning rate can be a high rate and if the throughput value of the application is high, the selected scanning rate can be a low rate. As also shown in table 800, if the throughput value of the application is an intermediate rate between the low throughput value and the high throughput value, then the selected signal scanning rate can be an intermediate rate between the high signal scanning rate and the low signal scanning rate. One or more other intermediate rates can be defined for table 800 for circumstances when the given frequency band is available.

An application with a high throughput rate (e.g., a high throughput requirement) can, for example, be an application executable by a UE device to receive, play, or transmit a video. An application with a low throughput rate can, for example, be an application executable by a UE device to receive, display, generate, or transmit an e-mail message. Application requirements can also be referred to as transmission latency requirements. For example, a video-conference application (e.g., a Skype® videoconference or video call application in which 2 or more people communicate) can provide better quality bi-directional communication between the 2 or more people with low transmission latency, otherwise high transmission latency can deteriorate the quality of the bi-directional communication. For a one direction video application, such as an application the UE device executes to receive a video from a server, the application can provide a better quality video display with low transmission latency, because as the transmission latency increases, the quality of the video being displayed can decrease (e.g., the received video stops or buffers multiple times while being played).

Also at block 506, PDE device 114 can refer to UE device information and network topology information received by the PDE device at block 504 and signal scan reporting rate data 214 to select the signal scan reporting rate. The UE device information can include data that indicates a speed of the UE device 102. The network topology information can include data that indicates a base station density for (or a quantity of BTS within) a given area, such an area in proximity to UE device 102 or the BTS serving UE device 102.

PDE device 114 can classify the speed of the UE device 102 with a speed value used by signal scan reporting rate data 214 based on a speed threshold, such as 30 miles per hour. For example, speeds above a speed threshold speed can be considered a high speed, whereas speeds below the speed threshold can be considered at low speed. Alternatively, the speed of UE device can be compared with two or more speed thresholds to classify a UE device speed within signal scan reporting data 214.

PDE device 114 can classify the quantity of BTS within the given area as a given base station density based on a threshold number of BTS, such as six BTS. For example, a quantity of BTS above the threshold number of BTS can be considered a high base station density, whereas a number of BTS equal to or below the threshold number of BTS can be considered a low base station density. Alternatively, the quantity of BTS within the given area can be compared with two or more BTS thresholds to classify the quantity of BTS, within the given area, within signal scan reporting data 214.

As an example, if UE device 102 is moving fast and there are a low number of BTS in the given area (i.e., a low BTS density), then PDE device 114 can select a fast signal scan reporting rate such that UE device 102 will send signal scan reports more frequently than if a slow signal scan reporting rate is selected. As another example, if UE device is moving slow and there are a large number of BTS in the given area (i.e., a high BTS density), then PDE device 114 can select a slow signal scan reporting rate, such as rate 4 in table 300, such that UE device 102 will send signal scan reports less frequently than if a faster signal scan reporting rate is selected.

Next, block 508 includes receiving signal scan reports. Receiving the signal scan reports can include PDE device 114 receiving the signal scan reports. One or more intermediary devices within system 100 between UE device 102 and PDE device 114 can receive a signal scan report as the report is transmitted towards PDE device 114. Each of the intermediary devices can transmit the signal scan report to another intermediary device or to PDE device 114.

Each received signal scan report can include a variety of information regarding the scanned signal, a UE device that scanned the signal, or a BTS that transmitted the signal scanned by the UE device. As an example, a signal scan report can include data to identify the UE device that scanned the signal and that generated the signal scan report. As another example, a signal scan report can include data to identify a BTS that transmitted the scanned signal or data to identify a location (e.g., a latitude and longitude) of the BTS that transmitted the scanned signal. As yet another example, a signal scan report can include a time and distance reading for the scanned signal. Other examples of information that can be included within a signal scan report are also possible.

PDE device 114 can store signal scan reports for one or more UE devices. PDE device 114 can store a given quantity of the most-recently received signal scan reports. As new signals scan reports are received for each UE device, the earliest-received signal scan reports being stored by PDE device 114 for the UE device can be deleted. Additionally or alternatively, PDE device 114 can delete signal scan reports for a UE device once PDE device 114 determines a position of the UE device using the signal scan reports. PDE device 114 can store the determined positions of the UE device for providing to an LBS being performed, for projecting a trajectory of the UE device, or for another reason.

Next, block 510 includes determining (i.e., making a determination) whether sufficient signal scan reports are available to determine a UE device position. Execution of CRPI 210 can cause processor 202 to determine that the PDE device has received signal scan reports for a UE device, but that an insufficient quantity of signals has been received. Processor 202 can make the determination of block 510 for each one or more periods for reporting signal scan reports.

The PDE may determine a change from receiving a sufficient quantity of signal scan reports to receiving an insufficient quantity of signal scan reports. Making this determination can occur after UE device is moved indoors or within a tunnel or to a location with low BTS density, or for some other reason. Upon determining that an insufficient quantity of signal scan reports has or are being received over a threshold number of periods for reporting signal scan reports, the set 500 proceeds (e.g., return) to block 506 for adjusting the signal scanning rate or the signal scan reporting rate. The adjustment of one or more of those rates can, for example, be based on a number of BTS signals, such as pilot signals, received during the currently selected signal scanning rate. The threshold number of periods discussed for block 510 can be 1 or more periods.

Executing CRPI 210 for block 510 can include processor 202 determining that a sufficient quantity of signal scan reports has been or is being received periodically from UE device 102. Upon making that determination, method 500 can proceed to block 512.

Next, block 512 includes determining a UE device position for UE device 102. Determining the UE device position can occur at or by PDE device 114. PDE device 114 can execute program instructions of CRPI 210 to determine the UE device position. The program instructions to determine the UE device position can be configured to use advanced forward link trilateration (AFLT). AFLT can include triangulating an approximate location of a UE device.

In general, and in order to get an optimal position fix on a UE device, determining a UE device position using AFLT can include using measurements of signals scanned from at least three BTS in proximity to the UE device, as well as latitude and longitude data for the base transceiver stations that transmit the signals scanned by the UE device, and map data. In the past, AFLT was performed using scan reports of signals from BTS using a single frequency band or a single radio air technology (RAT).

The program instructions of CRPI 210 are executable to use AFLT using scan reports of signals from a set of BTS using multiple frequency bands or multiple radio air technologies (RATs), as well as latitude and longitude data for the base transceiver stations that transmit the signals scanned by UE devices 102, and map data. UE device 102 is configured to provide PDE device 114 with the scan reports of signals from the set of BTS using multiple frequency bands or multiple RATs. System 100 can use prior art timing methods to synchronize the timing of the BTS within system 100. Alternatively, PDE device 114 can use other known methods of triangulating positions of a UE device based on the scan reports UE device 102 provides to PDE device 114.

PDE device 114 can store the UE device position determined for UE device 102 with previously determined positions of UE device 102. PDE device 114 can then map the determined positions of UE device 102. Mapping multiple positions of UE device 102 can be used by PDE device 114 to project a trajectory of UE device 102, track prior positions of UE device 102, or for some other reason(s).

Next, block 514 includes providing a UE device position for the requested LBS. Providing the UE device position can include PDE device 114 transmitting the UE device position to a device that will use the UE device position for carrying out the requested LBS. As an example, PDE device 114 can transmit the UE device position to a PSAP device, core network 112 or a device thereof, BSC 110, a BTS, or UE device 102.

Next, block 516 includes determining (i.e., making a determination) whether any additional UE device position(s) are needed for the requested LBS. If another UE device position is needed for the requested LBS, then the method of the set 500 can continue at block 518, otherwise the method of the set 500 can end for the requested LBS.

Next, block 518 includes determining (i.e., making a determination) whether a change in UE device or network topology information has occurred. As an example, making the determination of block 518 can include determining that a threshold amount of time has passed since the most recent UE device or network topology information was received by PDE device 114. The threshold amount of time can be 5 minutes, 10 minutes or some other amount of time greater than 0.0 seconds. As another example, making the determination of block 518 can include determining that PDE device 114 has received an update to UE device information or network topology information. Processor 202 can execute CRPI 210 to make the determination of block 518. If the determination of block 518 is that a change in UE device information or network topology information is available, has occurred, is likely to have changed, or should be checked for change (e.g., based on passing of the threshold amount of time), then the method of the set 500 can continue at block 504, otherwise, the method of the set 500 can continue at block 506.

V. Example User Equipment (UE) Device

Figure 7:
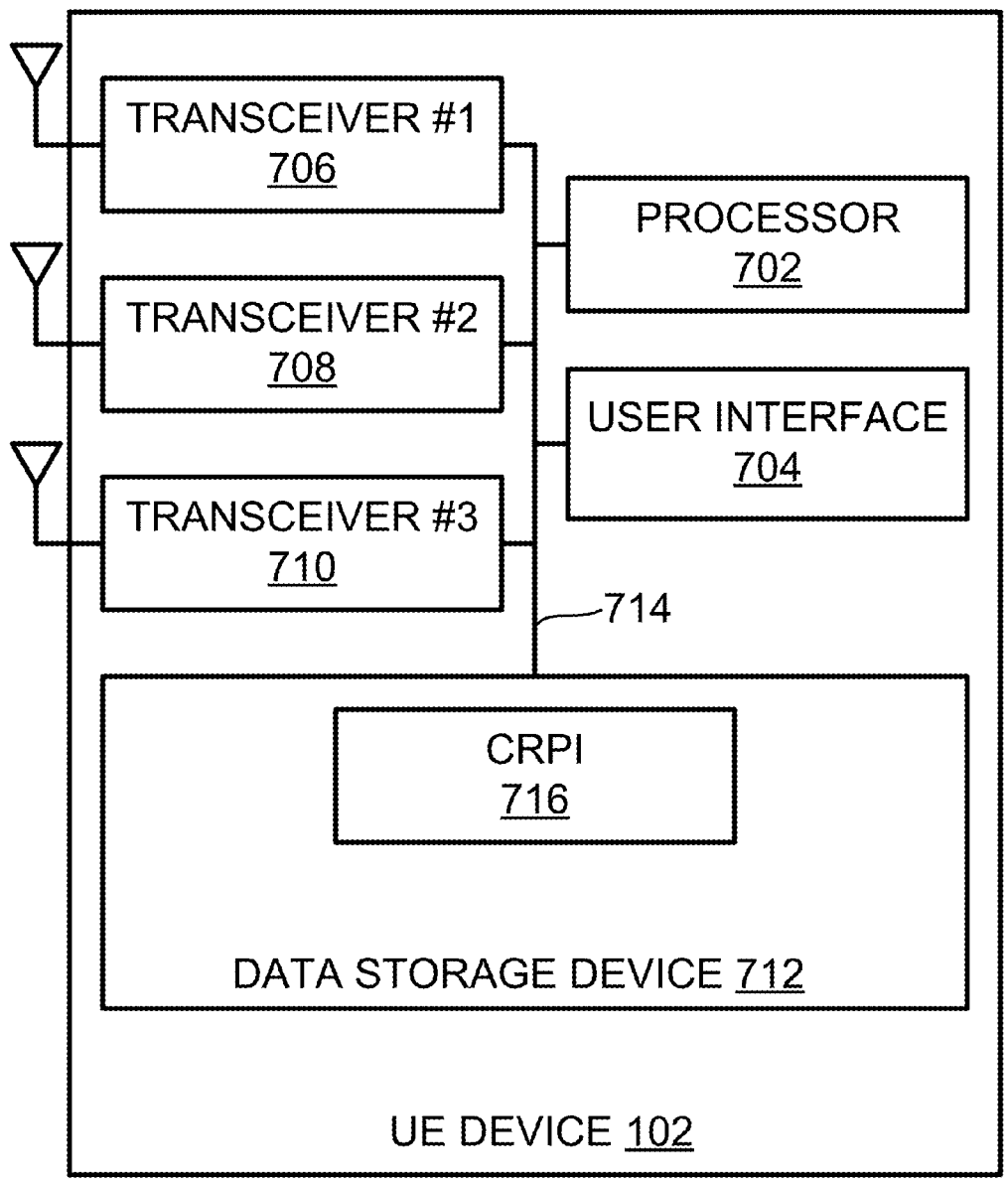
FIG. 7 is a simplified block diagram of a user equipment (UE) device in accordance with one or more example embodiments.

Next, FIG. 7 is a simplified block diagram of UE device 102 in accordance with one or more example embodiments. As shown in FIG. 7, UE device 102 includes a processor 702, a user interface 704, a first transceiver 706, a second transceiver 708, a third transceiver 710, and a data storage device 712, all of which can be linked together via a system bus, network, or other connection mechanism 714. Processor 702 can execute CRPI 716 stored in data storage device 712.

User interface 704 can include one or more input devices for a user to be able to provide data to processor 702, data storage device 712 or one of the transceivers 706, 708, or 710. The input device(s) of user interface 704 can include, but are not limited to, a microphone, a keyboard, a touch screen, and one or more feature buttons, such as a volume up, volume down, input or select buttons. User interface 704 can be used to select performance of an LBS for or by UE device 102. Other example elements and uses of the input devices of user interface 704 are also possible.

User interface 704 can include one or more output devices for presenting data to a user of UE device 102. The output device(s) can include, but are not limited to, an audio speaker for audibly presenting data to the user and a display device for visually presenting data to the user. User interface 704 can be used to present data for selecting an LBS or as a result of performing an LBS. Other example elements and uses of the output devices of user interface 704 are also possible.

Transceivers 706, 708, and 710 can be used for transmitting RF signals and receiving RF signals using a first RF frequency, such as 800 MHz, a second RF frequency, such as 1.9 MHz, and a third RF frequency, such as 2.5 GHz, respectively. Based on this arrangement, UE device can be considered a tri-band UE device. One or more of transceivers 706, 708, and 710 can be used for transmitting and receiving RF signals of a different frequency band. Two or more of transceivers 706, 708, and 710 can be configured for a common RAT, such as LTE. Alternatively, transceivers 706, 708, and 710 can be configured for using different RATs.

Processor 702 can execute CRPI 716 to scan the frequency bands using transceivers 706, 708, and 710 and to measure signals received using the transceivers and to determine time and distance values associated with the measured signals. The scanned or measured signals can include pilot signals broadcast by BTSs asynchronously with respect to the pilot signals broadcast by neighboring BTSs. Processor 702 can cause the transceiver communicating with the serving BTS to transmit the time and distance values determined from the measured pilot signals to PDE device 114.

One of the transceivers (e.g., transceiver 706) can communicate with the BTS serving UE device 102 and receive a signal scanning rate and signal scan reporting rate determined by PDE device 114. Those rates can be stored by data storage device 712. At other times, transceiver 708 or 710 can communicate with a BTS serving UE device 102.

Transceivers 706, 708 and 710 can be configured so that none of the transceiver needs to be disconnected (e.g., disabled from transmitting and receiving) while another of the transceivers is connected (e.g., enabled to transmit and receive). In this way, all three transceiver can be connected simultaneously so that UE device 102 can continuously scan signals from multiple frequency bands for determining a location of UE device 102 while keeping the transceiver 706 communicating with the serving BTS connected. Keeping transceivers 706, 708, and 710 connected can result in UE device 102 scanning more signals for determining a position of UE device 102.

In accordance with one or more example embodiments. UE device 102 can be configured to disconnect the transceivers that are not communicating with a serving BTS if an LBS is not being performed for UE device 102. Initiating performance of an LBS for UE device 102 can cause UE device 102 to connect any of the disconnected transceivers during performance of the LBS.

Processor 702 can execute CRPI 716 and refer to a signal scanning rate to scan or measure signals using transceivers 706, 708, and 710 according to the signal scanning rate(s) provided for the frequency band applicable to those transceivers. Processor 702 can execute CRPI 716 and refer to a signal scan reporting rate so as to transmit signal scan reports to PDE device 114 using the transceiver communicating with the BS serving UE device 102. The transceiver may transmit the signal scan reports using channel resources reserved for transmitting data for determining a UE device location.

Data storage device 712 can include data regarding applications executable by UE device 102. The data regarding an executable application can include a throughput value or a latency value associated with the application. The throughput value can represent a data transfer rate for transferring data within UE device 102 or transferring data to or from UE device 102. A data transfer rate can be specified in megabytes/second, gigabytes/second, or some other units. The data regarding an application can include a minimum allowed throughput value or a maximum allowed delay value for the application. The minimum allowed throughput value can be specified as a give data transfer rate. The maximum allowed delay value can be specified as a time in ms, seconds, or some other unit of time. A BTS or the core network 112 can provide reports on whether the minimum allowed throughput value or the maximum allowed delay value for an LBS are being satisfied.

CRPI 716 can include program instructions to determine a speed value of UE device 102 and to cause transceiver 706, 708, or 710 to transmit the speed value to PDE device 114.

CRPI 716 can include program instructions to determine time or distance values associated with a signal UE device scans. CRPI 716 can include program instructions to produced signal scan reports regarding the signals scanned by UE device 102 (e.g., signals scanned by transceiver 706, 708, and 710).

CRPI 716 can include program instructions to request performance or to perform an LBS by of for UE device 102. Executing those program instructions can include requesting a position of UE device 102 from PDE 114.

CRPI 716 can include program instructions for determining a throughput value or latency value for applications executing on UE device 102. Executing those program instructions can include transmitting the throughput value or latency value to PDE 114 for selecting a signal scanning rate or a signal scan report rate.

VI. Example Scan Reporting

Figure 6:
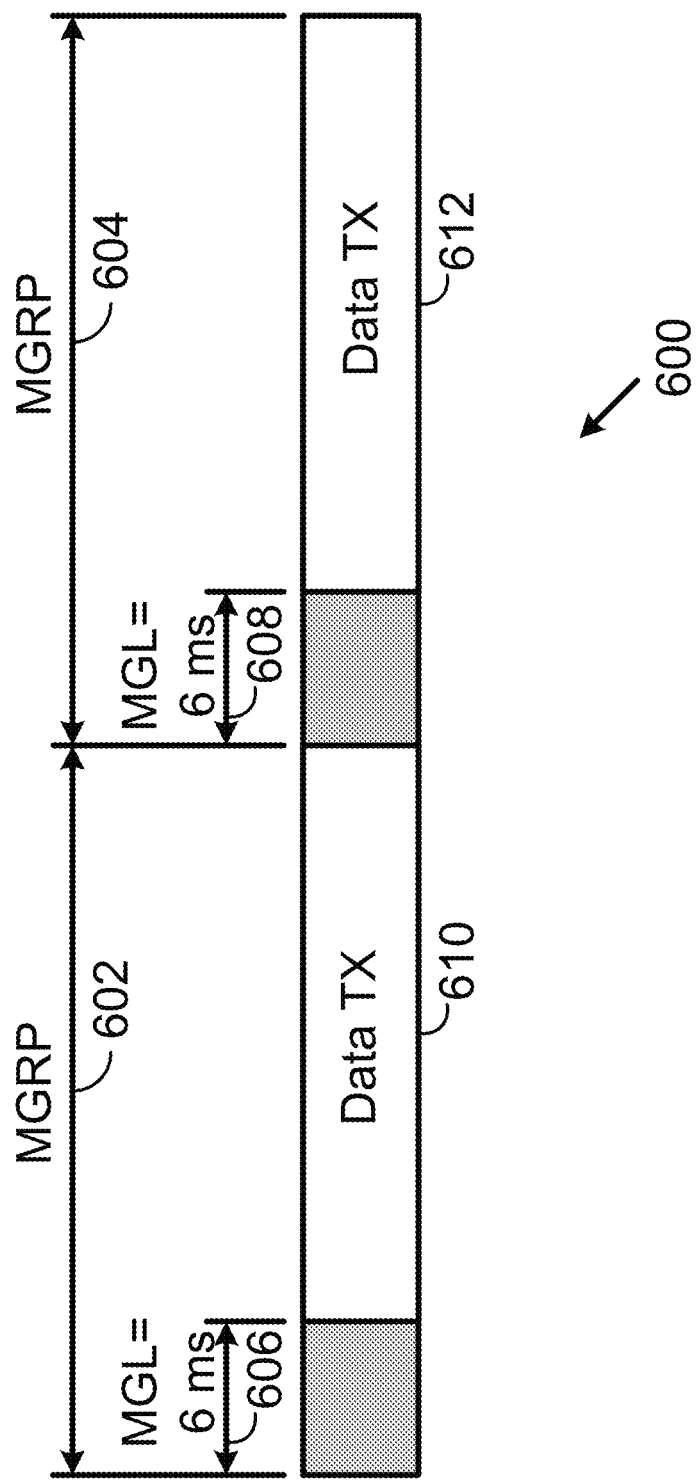
FIG. 6 is an example timing diagram in accordance with the example embodiments.

Next, FIG. 6 is a timing diagram 600 showing example measurement gap patterns including measurement gaps for scanning (e.g., monitoring) signals (e.g., pilot signals) from BTSs using multiple radio access technologies (RATs) during each measurement gap. The multiple RATs can, for example, include two or more of the following RATs: LTE, frequency division duplex (FDD), time division duplex (TDD), UMTS, or some other RAT.

In particular, timing diagram 600 includes two measurement gap repetition periods (MGRPs) 602 and 604. In accordance with the LTE standard, a gap pattern 0 has an MGRP set to 40 ms and a gap pattern 1 has an MGRP set to 80 ms. MGRPs 602 and 604 include measurement gap lengths (MGLs) 606 and 608, respectively, and data transmission periods 610 and 612, respectively. The different MGRP can be selected to choose between UE inter-frequency and inter-RAT measurement performance, UE device data throughput and efficient use of wireless transmission resources. In general, as a measurement gap density increases, a measurement performance improves, but can result in blocking a UE device from data transmission and reception.

In accordance with the example embodiments, a single MGL can be used to scan (e.g., measure or monitor) all frequency bands or RATs that can be scanned by UE device 102.

UE device 102 can operate in a radio-resource-control idle mode (RRC_no_connection) mode and in a radio-resource-control connected (RRC_connected) mode. The RRC_no_connection and RRC_connected modes are available using multiple air interface protocols such as, but not limited to, UMTS W-CDMA and LTE. While UE device 102 operates in the RRC_connected mode, UE device 102 measures signal power of its current frequency and reports the measurements to a BTS, such as an e-Node-B, serving UE device 102. If the reported signal power is below a predefined threshold (e.g., when UE device 102 is near a boarder of a BTS coverage area), the serving BTS can request UE device 102 to perform inter-frequency and inter-radio-access-technologies (inter-RAT) measurements.

The serving BTS (e.g., the serving e-Node-B) can transmit measurement configuration data to UE device 102. The measurement configuration data can include a measurement gap pattern sequence. During the measurement gaps, reception and transmission activities between the coverage area of the serving BTS and UE device 102 are interrupted.

Figure 4:
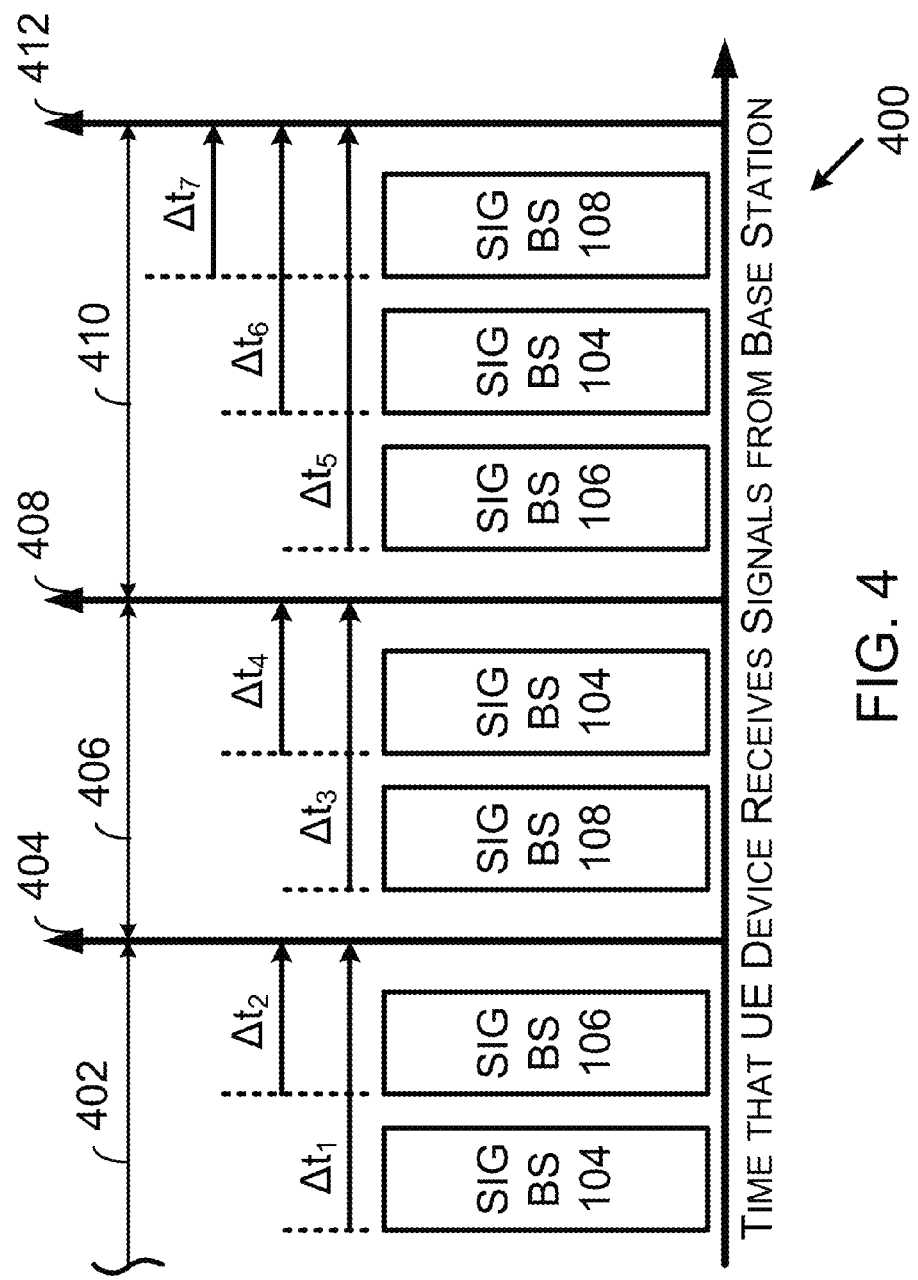
FIG. 4 is a timing diagram in accordance with the example embodiments.

Next, FIG. 4 is a timing diagram 400 showing example times that signals from BTS 104, 106 and 108 are received or measured by UE device 102 and signal scan reports are provided to PDE device 114 relative to the receipt or measurement times. Signals transmitted by BTS 104 are identified as SIG BS 104. Comparable identifications are used for signal transmitted by BTS 106 and BTS 108.

Timing diagram 400 includes signal scan reporting rates 402, 406, and 410. In accordance with an example, in which signal scan reporting rate 410 is longer than signal scan reporting rates 402 and 406, the additional time permits more base station signals to be measured during signal scan reporting rate 410. The delta times (i.e., $\Delta t_1$ through $\Delta t_7$) represent a time difference between a time when a signal (e.g., a pilot signal) from a base station is measured by UE device 102 and a time (or time and distance) measurement is reported to PDE device 114. Accuracy of estimating a position of UE device 102 can be impacted if the position of UE device changes considerably during a $\Delta t_a$. Lines 404, 408, and 412 represent times when signal scan reports are sent to or received by PDE device 114.

VII. Conclusion

Example embodiments have been described above. Those skilled in the art will understand that changes and modifications can be made to the described embodiments without departing from the true scope and spirit of the present invention, which is defined by the claims.

We claim:

1. A method comprising:
receiving, by one or more processors, a request regarding a location of a user equipment (UE) device, wherein receiving the request triggers the one or more processors to select for use by the UE device a signal scanning rate and a signal scan reporting rate;
storing, by a data storage device accessible to the one or more processors, a data structure containing a plurality of signal scan reporting rates, wherein each of the signal scan reporting rates is associated with a UE device speed value and a base station density value;
receiving, by the one or more processors, frequency band data pertaining to a location of the UE device, wherein the frequency band data indicates two or more frequency bands available for use by the UE device while the UE device is at or in proximity to the location, and for each frequency band of the two or more frequency bands a respective radio access technology used at that frequency band of the two or more frequency bands, and wherein one of the two or more frequency bands is the frequency band a base station is using to serve the UE device;
selecting, by the one or more processors and from among the plurality of signal scan reporting rates, a signal scan reporting rate for use by the UE device based on a UE device speed value determined based on a speed of the UE device and a base station density value determined for an area in proximity to the location of the UE device;
selecting, by the one or more processors and from among the plurality of signal scanning rates, a signal scanning rate for use by the UE device to scan for signals on at least one frequency band other than a frequency band the base station is using to serve the UE device, wherein selecting the signal scanning rate is based on the selected signal scan reporting rate, the determined UE device speed value, and the determined base station density value; and
providing, using a communication network, the selected signal scanning rate and the selected signal scan reporting rate to a transmitting device for wireless transmission of the selected signal scanning rate and the selected signal scan reporting rate to the UE device.

2. The method of claim 1, wherein receiving the incoming location request comprises receiving a location request from the UE device.

3. The method of claim 1, wherein receiving the incoming location request comprises receiving a location request from a location-based application executed off-board the UE device.

4. The method of claim 1, further comprising:
receiving, by the one or more processors, a first set of signal measurements performed by the UE device from one or more base stations using a first frequency band and a second set of signal measurements performed by the UE device from one or more base stations using a second frequency band,
determining, by the one or more processors using the first set of signal measurements and the second set of signal measurements, a location of the UE device.

5. The method of claim 1, further comprising:
receiving, by the one or more processors, an application requirement of an application executing on the UE device,
wherein selecting the signal scanning rate is conditioned on the application requirement of the application executing on the UE device.

6. The method of claim 5,
wherein applications executable on the UE device are classified by data throughput levels required to execute the applications on the UE device,
wherein a first throughput level and a second throughput level are defined for applications executable by the one or more processors,
wherein the first throughput level is less than the second throughput level, and
wherein a signal scanning rate selected by the one or more processors while executing an application with the first throughput level is less than a signal scanning rate selected by the one or more processors while executing an application with the second throughput level.

7. The method of claim 1,
wherein selecting the signal scanning rate is conditioned upon availability of the at least one frequency band other than the frequency band the base station is using to serve the UE device and a throughput value associated with an application executing on the UE device, and
wherein selecting the signal scan reporting rate is conditioned upon a determined speed of the UE device and a base station density value for an area proximate the UE device or the base station serving the UE device.

8. The method of claim 1, wherein the signal scanning rate is set to infinity for a particular frequency band to prevent the UE device from scanning the particular frequency band.

9. A system comprising:
one or more processors;
a non-transitory data storage device storing a plurality of signal scanning rates, a plurality of signal scan reporting rates, and computer-readable program instructions, wherein each of the signal scan reporting rates is associated with a user equipment (UE) device speed value and a base station density value, wherein the program instructions are executable by the one or more processors to:
(i) receive a request regarding a location of a UE device, wherein receiving the request triggers the one or more processors to select for use by the UE device a signal scanning rate and a signal scan reporting rate,
(ii) receive frequency band data pertaining to a location of the UE device, wherein the frequency band data indicates two or more frequency bands available for use by the UE device while the UE device is at or in proximity to the location, and for each frequency band of the two or more frequency bands a respective radio access technology used at that frequency band of the two or more frequency bands, and wherein one of the two or more frequency bands is the frequency band a base station is using to serve the UE device,
(iii) select, from among the plurality of signal scan reporting rates, a signal scan reporting rate for use by the UE device based on a UE device speed value determined based on a speed of the UE device and a base station density value determined for an area in proximity to the location of the UE device; and
(iv) select from among the plurality of signal scanning rates, a signal scanning rate for use by the UE device to scan for signals on at least one frequency band other than a frequency band the base station is using to serve the UE device, wherein selecting the signal scanning rate is based on the selected signal scan reporting rate, the determined UE device speed value, and the determined base station density value; and a communication network interface configured to provide the selected signal scanning rate and the selected single scan reporting rate to a transmitting device for wireless transmission of the selected signal scanning rate and the selected signal scan reporting rate to the UE device.

10. The system of claim 9,
wherein the communication network interface is configured to receive signal scan reports transmitted by the UE device at the selected signal scan reporting rate,
wherein the one or more processors is configured to determine a location of the UE device based, at least in part, on the received signal scan reports, and
wherein the communication network interface is configured to transmit the location of the UE device to a device performing a location-based service for the UE device.

11. The system of claim 9,
wherein selecting the signal scanning rate is conditioned upon availability of the at least one frequency band other than the frequency band the base station is using to serve the UE device and a throughput value associated with an application executing on the UE device, and
wherein selecting the signal scan reporting rate is conditioned upon a determined speed of the UE device and a base station density value for an area proximate the UE device or the base station serving the UE device.

12. The system of claim 9, wherein the computer-readable program instructions are executable to select the signal scanning rate and the signal scan report rate in response to the one or more processors determining that insufficient signal scan reports are being received to determine an accurate location of the UE device or in response to the communication network interface receiving updated information regarding the UE device or updated network topology information.

13. The system of 9, wherein the application executing on the UE device is a location-based service (LBS) application and the throughput value indicates at least one of a data transmission rate for the LBS application and a latency time for the LBS application.

14. The system of claim 9, wherein each signal scan reporting rate within the data structure is associated with at least one of a UE device speed value and a base station density value.

15. The system of claim 14, wherein selection of the signal scanning rate is based on the selected signal scan reporting rate, the UE device speed value, and the base station density value.

16. A method comprising:
selecting, by one or more processors and from among a plurality of signal scanning rates, a signal scanning rate for use by a user equipment (UE) device to scan for signals on at least one frequency band other than a frequency band a base station is using to serve the UE device;
selecting, by the one or more processors and from among a plurality of signal scan reporting rates, a signal scan reporting rate for use by the UE device based on a UE device speed value and a base station density value; and
providing, using a communication network, the selected signal scanning rate and the selected signal scan reporting rate to a transmitting device for wireless transmission of the selected signal scanning rate and the selected signal scan reporting rate to the UE device;
storing, by a data storage device accessible to the one or more processors, a data structure the one or more processors uses to select the signal scan reporting rate,
wherein the data structure includes each signal scan reporting rate of the plurality of signal scan reporting rates,
wherein each signal scan reporting rate within the data structure is associated with a UE device speed value and a base station density value,
wherein the selected signal scan reporting rate is selected from the group consisting of:
(i) a first signal scan reporting rate associated with a UE device speed value greater than a speed threshold and a base station density less than a density threshold,
(ii) a second signal scan reporting rate associated with a UE device speed greater than the speed threshold and a base station density greater than the density threshold,
(iii) a third signal scan reporting rate associated with a UE device speed less than the speed threshold and a base station density less than the density threshold, and
(iv) a fourth signal scan reporting rate associated with a UE device speed less than the speed threshold and a base station density greater than the density threshold, and
wherein the fourth signal scan reporting rate is slower than the third signal scan reporting rate,
wherein the third signal scan reporting rate is slower than the second signal scan reporting rate, and
wherein the second signal scan reporting rate is slower than the first signal scan reporting rate.

* * * * *